United States Patent
Reynolds et al.

(10) Patent No.: US 9,874,968 B2
(45) Date of Patent: Jan. 23, 2018

(54) POINT TO POINT INTERFACE COMMUNICATION AND REFERENCE

(71) Applicant: SYNAPTICS INCORPORATED, San Jose, CA (US)

(72) Inventors: Joseph Kurth Reynolds, Alviso, CA (US); Stephen L. Morein, San Jose, CA (US); Jeffrey Lukanc, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 13 days.

(21) Appl. No.: 14/788,636

(22) Filed: Jun. 30, 2015

(65) Prior Publication Data

US 2016/0195977 A1    Jul. 7, 2016

Related U.S. Application Data (60) Provisional application No. 62/100,042, filed on Jan. 5, 2015.

(51) Int. Cl.
| | |
|---|---|
| G09G 5/00 | (2006.01) |
| G06F 3/041 | (2006.01) |
| G06F 3/044 | (2006.01) |
| G06F 3/0354 | (2013.01) |

(52) U.S. Cl.
CPC ............ G06F 3/0416 (2013.01); G06F 3/044 (2013.01); *G06F 3/03547* (2013.01); *G06F 2203/04108* (2013.01)

(58) Field of Classification Search
CPC .. G06F 2203/041; G06F 3/044; G06F 3/0416; G06F 2203/04108; G09G 3/0412
USPC ................... 345/173–174; 178/18.06
See application file for complete search history.

(56) References Cited

U.S. PATENT DOCUMENTS

| | | |
|---|---|---|
| 9,030,394 B2 | 5/2015 | Liu |
| 9,046,955 B1 | 6/2015 | Lee et al. |
| 2011/0007019 A1* | 1/2011 | Tasher .................. G06F 3/0416 345/174 |
| 2013/0257847 A1 | 10/2013 | Lee et al. |
| 2013/0314369 A1 | 11/2013 | Liu |
| 2013/0328829 A1 | 12/2013 | Lee |
| 2014/0253501 A1 | 9/2014 | Noguchi et al. |
| 2014/0292709 A1 | 10/2014 | Mizuhashi et al. |
| 2014/0333563 A1* | 11/2014 | Saitoh .................. G09G 3/3648 345/173 |
| 2015/0153858 A1 | 6/2015 | Kim et al. |
| 2015/0177880 A1 | 6/2015 | Shin et al. |
| 2015/0346887 A1* | 12/2015 | Cho ...................... G06F 3/0412 345/174 |

* cited by examiner

*Primary Examiner* — Jennifer Nguyen
(74) *Attorney, Agent, or Firm* — Patterson + Sheridan, LLP (57) ABSTRACT

This disclosure generally provides a processing system that includes a first controller coupled with a second controller via a first communication link. The first controller is configured to transmit display data to the second controller via the first communication link. The second controller is configured to drive, using the display data, one or more coupled display electrodes for performing display updating. The second controller is further configured to operate one or more coupled sensor electrodes to acquire capacitive sensing data, and to transmit the capacitive sensing data to the first controller via the first communication link.

20 Claims, 4 Drawing Sheets

POINT TO POINT INTERFACE COMMUNICATION AND REFERENCE

CROSS-REFERENCE TO RELATED APPLICATIONS

This application claims benefit of U.S. provisional patent application Ser. No. 62/100,042, filed Jan. 5, 2015, entitled "Point to Point Interface Communication and Reference," which is herein incorporated by reference.

BACKGROUND

Field

Embodiments of the present disclosure generally relate to electronic devices.

Background of the Disclosure

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE DISCLOSURE

One embodiment described herein includes a processing system that includes a first controller coupled with a second controller via a first communication link. The first controller is configured to transmit display data to the second controller via the first communication link. The second controller is configured to drive, using the display data, one or more coupled display electrodes for performing display updating. The second controller is further configured to operate one or more coupled sensor electrodes to acquire capacitive sensing data, and to transmit the capacitive sensing data to the first controller via the first communication link.

Another embodiment described herein includes a first controller comprising circuitry that is configured to receive, via a first communication link, display data from a second controller, and to drive, using the display data, one or more coupled display electrodes for performing display updating. The first controller is further configured to operate one or more coupled sensor electrodes to acquire capacitive sensing data, and to transmit the capacitive sensing data to the second controller via the first communication link.

Another embodiment described herein includes a first controller comprising circuitry that is configured to transmit display data to a second controller via a first communication link, where the second controller is configured to drive one or more display electrodes to perform display updating based on the display data. The first controller is further configured to receive capacitive sensing data from the second controller via the first communication link, where the second controller is further configured to acquire the capacitive sensing data using one or more coupled sensor electrodes.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present disclosure provide a processing system having a first controller coupled with a second controller via a first communication link. The first controller may be a timing controller, and the second controller may include one or more source drivers or gate drivers for updating lines of an integrated display/sensing panel. The first controller operates to transmit display data to the second controller via the first communication link. The second controller is configured to drive one or more coupled display electrodes using the display data for performing display updating. The second controller is further configured to operate one or more coupled sensor electrodes to acquire capacitive sensing data, and to transmit the capacitive sensing data to the first controller via the first communication link.

In some embodiments, processing of acquired capacitive sensing data may occur on the second controller before transmitting to the first controller via the first communication link. In some embodiments, the first controller (e.g., a timing controller) may perform processing on received capacitive sensing data, whether processed by the second controller or unprocessed. In some embodiments, a host coupled with the first controller may perform processing on received capacitive sensing data. During exemplary operation, the first controller receives capacitive sensing data from the second controller via the first communication link, processes the capacitive sensing data, and updates the display data in response to the user input determined from the capacitive sensing data. The timing of the display updating is controlled based on high-speed data received from the host.

By distributing the processing system across multiple controllers, the costs and size of the overall processing system can be reduced. In some cases, the first controller may couple with a plurality of second controllers that drive different display electrodes within the integrated display/sensing panel. In addition to transmitting display data, the first controller may transmit configuration data to the second controllers to configure a capacitive sensing functionality of the second controllers. In some embodiments, the timing controller provides an embedded clock signal with the transmitted data on the first communication link, such that the first communication link supports both display updating and capacitive sensing using a minimum of three wires. For example, the first controller (e.g., a timing controller) downlink provides a clock and data that may be used for display updating, configuring capacitive sensing, and/or establishing timing for transmitting the capacitive sensing data on the uplink. This disclosure also describes a number of possible configurations of the distributed processing system across unmodulated and modulated power domains.

Figure 1:
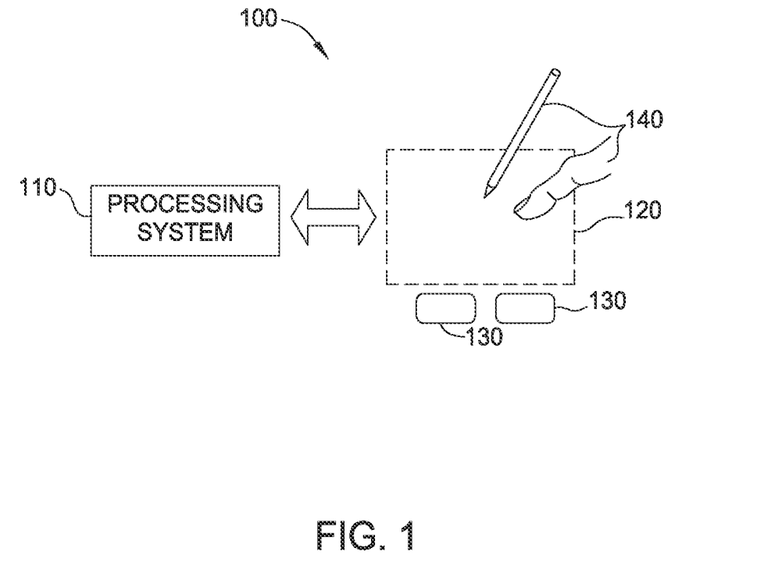
FIG. 1 is a block diagram of an exemplary system that includes an input device, according to embodiments described herein.

Turning now to the figures, FIG. 1 is a block diagram of an exemplary system that includes an input device 100, according to embodiments described herein. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA. Some additional examples include Embedded DisplayPort™ (eDP), MIPI®, Peripheral Component Interconnect Express® (PCIe), etc.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1. Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive. In some embodiments, the routing to capacitive sensing elements may be included on an opposite side of a dielectric (or substrate) from a sensing surface, and the controller may connect with these capacitive sensing elements using vias. In some embodiments, the controller may connect with capacitive sensing elements included on additional dielectrics.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In some embodiments, the processing system 110 (e.g., a sensing controller or timing controller component) updates the output display data directly (that is, without requiring a complete update of the display data by the associated host) based on received user input. Such embodiments may reduce latency of display updating.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and providing a touch screen interface for the associated electronic system. In another example, the sensor electrodes may be hidden from a user's view by including a black mask. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
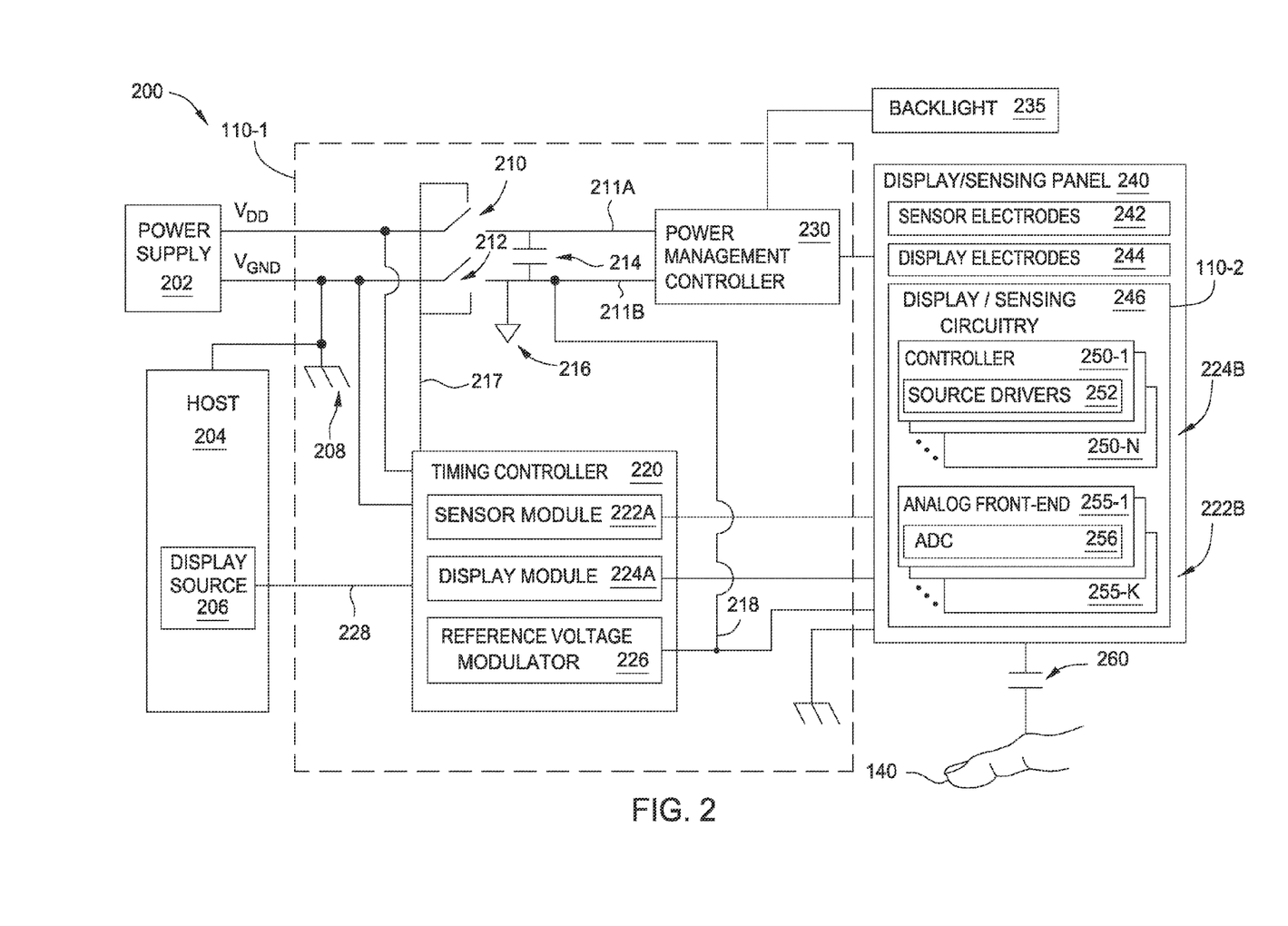
FIG. 2 is a block diagram of an exemplary input device, according to embodiments described herein.

FIG. 2 is a block diagram of an exemplary input device 200, according to embodiments described herein. The input device 200 includes a power supply 202, a host 204, processing system components 110-1 and 110-2 (collectively referred to as processing system 110), a backlight 235, and a display/sensing panel 240 (also "panel 240"). For some display technologies (e.g., LED or OLED) the backlight 235 may not be needed. Alternately, a backlight 235 for an LCD may be powered separately using, e.g., a boost converter separate from a power management controller. In such a case, the backlight 235 may be controlled directly by the host 204 in a unmodulated voltage domain. However, the reference voltage rail modulation techniques may nonetheless be used to perform capacitive sensing. In one embodiment, the power supply 202 is a DC power source that outputs at least two reference voltages—$V_{DD}$ and $V_{GND}$—which provide power to the processing system 110 and to the display/sensing panel 240. The power supply 202 may be a battery or a power converter that is plugged into an external power source (e.g., an AC or DC electrical grid). As used herein, the low reference voltage (i.e., $V_{GND}$) is also referred to as chassis ground 208 to indicate that it is the reference voltage for the input device 200. In contrast, other power domains in the input device 200 may include local ground references (e.g., a modulated local ground 216), which may be the same voltage as chassis ground 208 or a different voltage. For example, the local ground 216 can at times be the same voltage as the chassis ground 208, but during other time periods may be modulated by being driven to different voltages. The power management controller may further supply one or more voltages relative to local ground 216, such as a Vcom voltage, "high" and "low" voltages for gate control, a "high" voltage for source control, and so forth.

In one embodiment, the host 204 represents a general system of the input device 200 that performs any number of functions such as placing phone calls, transmitting data wirelessly, executing an operating system and/or applications, and the like. The host 204 includes a display source 206 which provides updated data frames to the processing system 110. For example, the display source 206 may be a graphics processing unit (GPU) which transmits pixel or frame data to the processing system 110 in order to update a display on the display/sensing panel 240. To provide the update display data, display source 206 is coupled to the processing system 110 via a high-speed link 228 capable of transmitting data at speeds typically greater than or equal to 1 gigabit per second (Gbps). For example, the display source 206 may use Embedded DisplayPort™ (eDP) or MIPI® display interfaces to communicate display data using the high-speed link 228. In some embodiments, the high-speed link 228 is operated in an unmodulated voltage domain.

As stated above, the processing system 110 includes components 110-1, 110-2. Each of the components 110-1, 110-2 can be included in different portions of the input device 200. For example, component 110-1 may be included on a printed circuit board (PCB) of the input device 200, and component 110-2 may be included within the display panel 240, such as deposited on one or more of the glass layers. In another example, a host 204 communicates through a laptop hinge to a timing controller 220 on a PCB, which connects to display panel 240 through a flexible connector. In another example, host 204 includes the functionality of the timing controller 220 and communicates through the hinge to a capacitive sensing controller on the PCB, which connects to the display panel 240. In another example, the host communicates directly with a single IC (configured to perform capacitive sensing and display driving) in the display panel 240. In some embodiments, where multiple display voltage supplies are generated (e.g., by power management controller 230), when components or portions of the processing system 110 are included in a modulated power domain, the components or portions may be included on the flexible connection or on the PCB, but are typically not included with the host 204.

The components 110-1 and 110-2 are communicatively coupled, e.g., through flexible connectors or other conductive wiring, and the components 110-1, 110-2 together operate to perform display updating and input sensing functions for the input device 200. By separating portions of the processing system, the overall cost and size of the processing system 110 may be reduced. For example, the component 110-1 includes a significant proportion of digital logic hardware, while component 110-2 includes predominantly analog circuitry (e.g., high voltage circuitry, high precision circuitry, and/or conversion and buffering digital data circuitry). Thus, the component 110-1 may be implemented using a smaller feature size process (e.g., 55 nanometer or smaller) to reduce the size of the component 110-1. However, the component 110-2 may be implemented in a larger feature size process (e.g., 120 nm) that is better suited for driving the higher voltages associated with display updating. In some cases, the functionality of a timing controller 220 may be contained within the host 204, which may require an associated downlink (e.g., FIG. 3, elements 310) to be kept in an unmodulated voltage domain. An uplink used for providing capacitive sensing data may be modulated or unmodulated. In some embodiments, the display downlink and/or capacitive sensing uplink is modulated only during periods when the display is not being updated (e.g., during long h-blank line periods, discussed below), and not modulated while the display is updating. In this way, the uplink and downlink may be used to communicate when the display panel is operating with unmodulated voltages, and when the display panel operates with modulated voltages the uplink and downlink in some cases do not communicate.

The processing system 110-1 includes switches 210, 212, a timing controller 220, and a power management controller 230. The switches 210, 212 selectively couple reference voltage rails 211A, 211B (also reference voltage rails 211) to the power supply 202. Using control signal 217, the timing controller 220 can open and close the switches 210, 212 to thereby electrically connect and disconnect the reference voltage rails 211 with the power supply 202. Although depicted as a conductive connection, in other embodiments the reference voltage rails 211 may be capacitively or inductively coupled to the power supply 202. For inductive coupling, in some cases the control signal 217 may not be needed to disconnect the reference voltage rails (e.g., chassis ground from local ground).

When switches 210, 212 are closed, the power supply 202 charges a bypass capacitor 214. When the switches 210, 212 are open, the charge stored on the bypass capacitor 214 can be used to power the reference voltage rails 211, which are then used to power various components in the input device 200 (e.g., power management controller 230, backlight 235, or display/sensing panel 240). In one embodiment, the timing controller 220 may periodically open and close the switches 210, 212 using control signal 217 to maintain a constant, average voltage across the bypass capacitor 214 and the rails 211. Alternatively, the backlight 235 may be coupled with a separate high-current supply and is not included in a modulated voltage domain.

The timing controller 220 includes a sensor module 222A, display module 224A, and a reference voltage modulator 226. The display/sensing panel 240 includes sensor electrodes 242, display electrodes 244, and display/sensing circuitry 246. The display/sensing circuitry 246 includes one or more controllers 250-1 to 250-N (collectively or generically, controllers 250). Some or all of the controllers 250 include source drivers 252 and/or gate drivers (not shown) used to drive desired signals onto pixels of the display/sensing panel 240. In some embodiments, controllers 250 include separate display driver ICs and sensing ICs that are communicatively coupled. The display driver IC operates to drive the display electrodes 244, and the sensor module 222 operates to drive the sensor electrodes 242. Which ones of the display electrodes 244 and/or sensor electrodes 242 that are driven at a particular may be controlled using, e.g., a multiplexer.

Portions of the display/sensing circuitry 246 may comprise a sensor module 222B and/or a display module 224B. The sensor and display modules 222B, 224B of processing system component 110-2 communicate with respective sensor and display modules 222A, 224A of processing system component 110-1, and together operate to provide respective capacitive sensing and display updating functions for the input device 200. Collectively, sensor modules 222A, 222B are referred to as sensor module 222, and display modules 224A, 224B are referred to as display module 224. In some embodiments, the sensor module 222B includes one or more receivers 255-1 to 255-K (collectively or generically, receiver 255) for coupling with the sensor electrodes 242. Each receiver 255 may include circuitry for conditioning the signals received on the sensor electrodes 242, such as an analog-to-digital converter (ADC) 256, other signal conditioning elements or digital logic (e.g., multiplexers), and so forth. In some embodiments, the receivers 255 comprise an analog front-end (AFE). In some embodiments, the receivers 255 may include other hardware and/or software for processing the signals received on the sensor electrodes 242.

The sensor module 222 is coupled with elements of the display/sensing panel 240, such as the sensor electrodes 242. In some embodiments, a multiplexer or other suitable switching element(s) may be used to couple the sensor electrodes 242 with a receiver (e.g., with an AFE of a receiver circuit). The switching element(s) may be included within the sensor module 222 or may be external to the sensor module 222. Using the sensor electrodes 242, the sensor module 222 performs capacitive sensing in the sensing region 120 (FIG. 1), within which the sensor electrodes 242 may be disposed. As discussed above, the sensor module 222 may use self-capacitance, mutual capacitance, or a combination of both to identify a particular location in the sensing region 120 where an input object is contacting or hovering over the input device 200. In some embodiments, instructions related to performing capacitive sensing are downloaded by the sensor module 222 from one of the host 204, a separate (Flash) memory IC, the power management controller 230, and a separate capacitive sensing IC. Downloading instructions may occur upon startup of the sensor module 222 and/or periodically.

The display module 224B includes display circuitry such as source drivers 252, gate selection logic, and gate control connections, and the display module 224B is configured to couple with display electrodes 244 (e.g., source electrodes, gate electrodes, common electrodes) for updating a display in the panel 240. For example, based on the display data received from the display source 206, the display module 224A iterates through the rows of the display using gate electrodes, updating each of the pixels in the selected row using source electrodes. In this manner, the display module 224A can receive updated display frames from the host 204 and update (or refresh) the individual pixels in the display/sensing panel 240 accordingly.

The reference voltage modulator 226 generates a reference signal 218 that can be used to modulate reference voltage rails 211 to provide one or more modulated power domains within the input device 200. In some embodiments, the reference signal 218 may be provided to the power management controller 230 and/or the display/sensing panel 240 through conductive connections with the timing controller 220. Generally, the reference signal 218 is used to control the extent of modulation on the reference voltage rails 211. In one embodiment, the reference signal 218 is referenced with chassis ground 208. In one embodiment, the power supplies included in the modulated power domain are electrically isolated from the power supply 202 so as not to affect the voltage levels that are supplied to the input device 200, such as $V_{DD}$ and $V_{GND}$. For example, the timing controller 220 may open switches 210, 212 when reference voltage modulator 226 modulates the reference voltage rails 211 using reference signal 218. If the voltage levels of $V_{DD}$ and $V_{GND}$ were affected by the reference signal, other components of the input device 200 that rely on the voltage levels supplied by the power supply 202 may behave unpredictably or improperly. For example, the host 204 (or other components of input device 200 that are not shown) may also use the power supply 202 to power its components (e.g., the high-speed display data source). The host 204 may be designed to operate with unmodulated voltage levels, and thus, if the modulation signal were not electrically isolated from power supply 202, the modulation signal may have a negative effect on the operation of host 204, or may require extreme and/or expensive design constraints. In some embodiments, multiple display voltages are generated by the power management controller 230 in the modulated power domain.

In one embodiment, the reference signal 218 modulates the reference voltage rails 211 by increasing or decreasing the voltages on the rails in a discrete or periodic manner. In one example, the reference signal 218 causes a same or a similar voltage change on both reference voltage rails 211A and 211B such that the voltage difference between the rails 211 remains substantially constant. For example, if $V_{DD}$ is 4 volts (V) and $V_{GND}$ is 0 V, the reference signal 218 may add a ±1 V voltage swing on both rails such that voltage rail 211A changes between 5 V and 3 V, while voltage rail 211B changes between −1 V and 1 V. Nonetheless, the voltage difference between the reference voltage rails 211 (i.e., 4 V) remains the same. However, in another embodiment, the reference voltage modulator 226 may modulate only one of the voltage rails 211. For example, reference voltage rail 211A may remain constant (e.g., 3 V) while reference voltage rail 211B is modulated (e.g., between −1 V and 1 V). Moreover, the modulated reference signal 218 may be a periodic signal (e.g., a sine or square wave) or a non-periodic signal where the modulation is not performed using a repetitive signal. In some embodiments, the modulated reference signal 218 may act as a transmitter for performing an absolute capacitive measurement. Additionally, where both the modulated reference and an unmodulated reference (e.g., a chassis ground or VDD) are provided, the amplitude of the modulation may be used to provide a reference (e.g., amplitude, phase, and/or frequency) for the AFE 255 and/or ADC 256 that may also be demodulated and/or otherwise filtered relative to the signal.

By modulating the reference voltage rails 211 using the reference signal 218, voltage signals from outside of the processing system 110 (e.g., a chassis ground) appear to be modulating relative to panel components. That is, to the powered components of the processing system 110, it appears that their own voltage is stable while the systems outside the processing system 110 are modulating, including any input object proximate to the panel 240 as well as other components in the input device 200 that are not coupled with the reference voltage rails 211. One advantage of modulating the reference voltage rails 211 is that all components that are coupled with the rails are modulated by the same reference signal 218. Thus, a separate modulation signal does not need to be driven on the display electrodes 244 or other display/sensing circuitry 246 in order to guard the display electrodes so they do not interfere with capacitive sensing measurements. Put differently, the voltage difference between the electrodes used to perform capacitive sensing and the various components in the display/sensing panel 240 does not change. Thus, even if the electrodes and the components in the panel 240 are capacitively coupled, this coupling capacitance does not affect the resulting signal generated on the electrodes, e.g., a user input coupled to a chassis ground.

The power management controller 230 (e.g., a power management integrated circuit (PMIC)) generates one or more voltages used for powering the display/sensing circuitry 246 in the display/sensing panel 240 and/or other components of the input device 200 (e.g., backlight 235). The power management controller 230 may include a plurality of different power supplies that supply the different voltages. The power management controller 230 may be programmable. To generate the different voltages, the power supplies can be implemented as switched power supplies that use inductive boost circuits or charge pumps to change the DC voltage levels provided by the reference voltage rails into different DC voltages for operating the circuitry of the panel 240. In some embodiments, the power management controller 230 can generate a display panel common voltage (e.g., Vcom) used by different components of the processing system 110. The power management controller 230 may also be incorporated within a chip on glass (e.g., COG) to reduce chip count and to provide similar display panel voltages, such as gate high/low voltages (VGH, VGL), source driver high voltage (AVDD), Half-AVDD, Vcom, etc. within the modulated power domain. In some embodiments, the timing controller 220 (or capacitive sensing computing components thereof) may also be integrated into the unmodulated power domain that is also used by the host 204.

The components of the processing system 110 may be arranged in many different configurations using one or more integrated circuits (or chips). In one embodiment, the sensor module 222A, display module 224A, and reference voltage modulator 226 may be disposed on the same integrated circuit. In one embodiment, the sensor module 222A may be disposed on a different integrated circuit than the reference voltage modulator 226, e.g., combined with the display module 224A. In another embodiment, the sensor module 222A, display module 224A, and the reference voltage modulator 226 may be disposed on three separate integrated circuits. In another embodiment, the sensor module 222A and the reference voltage modulator 226 are disposed on the same integrated circuit (e.g., a Chip on Glass) while the display module 224A is disposed on a separate integrated circuit (e.g., a separate timing controller 220, or a timing controller integrated into a host IC). Furthermore, in one embodiment, the display module 224A is disposed on one integrated circuit while at least a portion of the display module 224B (e.g., a source driver 252) is disposed on a second integrated circuit, and the reference voltage modulator 226 is disposed on a third integrated circuit (e.g., the power management controller 330). In some embodiments, the power management controller 330 may also be integrated into the same IC as the source driver 252 on the panel 240, and/or the reference voltage modulator 226 may be incorporated into the same IC as the source driver 252, even where the display module 224 is integrated onto a separate (e.g., digital) IC.

In some embodiments, some or all of the functionality of the timing controller 220 is included in the host 204. In some embodiments, the timing controller 220 and source drivers 252 may be included on the same IC, with or without the power supply. Additionally, some embodiments may include separate display driver IC(s) and sensor device IC(s), and the communication can be between sensor devices IC to the display driver IC to the host, or from the host to display driver IC and sensor device IC.

Figure 3:
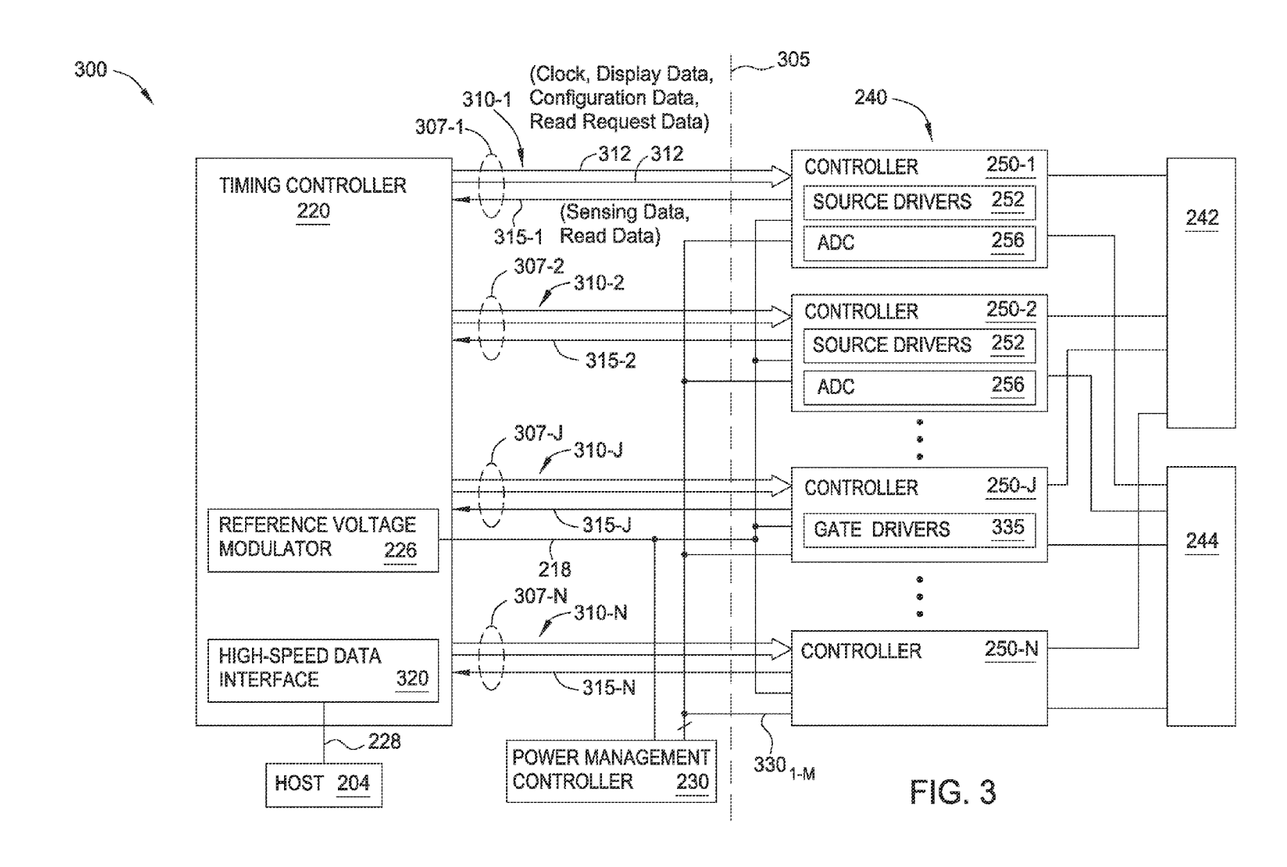
FIG. 3 is a block diagram of an exemplary processing system for an input device, according to embodiments described herein.

FIG. 3 is a block diagram of an exemplary processing system for an input device, according to embodiments described herein. Processing system 300 generally represents one possible implementation of the processing system 110 discussed above.

Processing system 300 includes timing controller 220 that is coupled with a host 204 through a high-speed data interface 320 (e.g., an eDP or MIPI interface). As will be discussed further, the high-speed data interface 320 may be in an unmodulated power domain to allow direct communication—that is, without requiring level shifting of voltages—with or within the host 204. The host 204 transmits display data using the high-speed link 228. Timing controller 220 is communicatively coupled with a plurality of controllers 250. The controllers 250, as well as sensor electrodes 242 and display electrodes 244, are included as part of display/sensing panel 240, which is depicted as those components located to the right of the dashed line 305. The controllers 250 may include one or more source drivers 252 and/or one or more gate drivers 335 used for operating the display electrodes 244. In some embodiments, a first number of the N controllers 250 are designated for source drivers 252, and a second number of the N controllers 250 are designated as gate drivers 335.

The timing controller 220 communicates with each of the controllers 250-1 to 250-N through a respective communications link 307-1 to 307-N. Each communications link 307 comprises a respective downlink 310 and a respective uplink 315. In some embodiments, the downlink 310 and uplink 315 are in the unmodulated power domain. In some embodiments, the downlink 310 and uplink 315 are in the modulated power domain. Deep n-well ASIC isolation or multi-chip module isolation techniques may be used for the timing controller 220 and/or controllers 250 when in the modulated power domain.

Each downlink 310 includes at least two wires 312 and is configured to carry data and an embedded clock signal transmitted by the timing controller 220 to the respective controller 250. In some embodiments, the embedded clock signal is used to interpret and control the output of display data. In some embodiments, the embedded clock signal is also used to control the timing for operating capacitive sensing circuitry and/or the timing of uplink data. Typically, the data includes display data received by the timing controller 220 at the high-speed data interface 320, but in some embodiments other types of data may be included. For example, the timing controller 220 may transmit configuration data, which the controller 250 uses to configure capacitive sensing operation. In another example, the timing controller 220 may transmit data requesting a read of one or more memory or register locations within the controller 250. In some embodiments, the timing controller 220 is configured to perform other processing to adjust the properties of the display data for output using display electrodes 244. The source drivers 252 drive the display electrodes 244 with the (adjusted) received display data to perform display updating for a portion of the display/sensing panel 240.

Each uplink 315 includes at least one wire and is configured to carry data transmitted by the controller 250 to the timing controller 220. In some embodiments, the uplink 315 may be used to report sensing data acquired by sensor electrodes 242, which can be converted to a digital signal using an ADC. In some embodiments, controllers 250 may transmit register read data using the uplink 315.

The power management controller 230 may be connected with each of the controllers 250, providing power signals $330_{1-M}$ at different voltage levels, such as a Vcom and one or more analog and/or digital voltage levels. In one embodiment, the voltage supply outputs from the power management controller 230 may be included on the panel side or on a PCB (that is, on the host side of the display flex connection) but are still included in the isolated or modulated power domain. As discussed above, the power signals $330_{1-M}$ generated by the power management controller 230 may be modulated based on a reference signal 218 from the timing controller 220. In some embodiments, the power signals $330_{1-M}$ are modulated during capacitive sensing periods that do not overlap with low power duty cycle modes, interference measurements, etc.

During operation of the processing system 300, timing controller 220 configures the sensing registers of the controller 250 using the downlink 310, and the uplink 315 is used to report sensing data acquired from the ADCs of the controller 250 and/or register data from the controllers 250. The timing controller 220 can specify certain register location(s) to be read, and the controller 250 reports values of those registers back to the timing controller 220 using the uplink 315. The data in the register may include sensing data or other types of data.

In some embodiments, data read from registers of the controllers 250 may be used for other purposes. For example, register data can be used to perform error detection and/or correction, such as a cyclic redundancy check (CRC) or any other suitable techniques. The register data can also be used for testing the operation of controllers 250 and/or for performing scrambling techniques, such as spread-spectrum techniques used to minimize radiated power from the processing system 300.

In some embodiments, the processing system 300 is also configured to perform interference detection at times using the sensor electrodes 242. An active input device, such as an active pen, generally emits a signal that is coupled with the sensor electrodes 242 to provide input to the processing system 300. During times of interference detection, the timing controller 220 need not perform modulation as the modulated signal is provided by the source of interference (e.g., the active pen).

Because the clock signal is embedded with data transmission from the timing controller 220, a single clock signal may be used for the downlink 310; the clock signal is recoverable at the controllers 250 by applying the received data to a delay-locked loop. The data transmitted on downlink 310 drives display data and/or configures sensing data, and can also regulate the timing of when the display data is displayed and when the sensing data is acquired. The timing aspect or configuration of a line of the downlink data can also control whether a particular line is configured as a display line or a blanking line such as a horizontal blank line (h-blank), a long h-blank line that exceeds one line update time period, etc. The clock signal contained in the downlink 310 is further configured to regulate the speed of the uplink 315, so that a separate clock is not required to perform display operation, sensing operation, and uplink clocking. The timing controller 220 thus receives a signal at an expected speed on the uplink 315, though the received signal may exhibit a phase delay that may be corrected through appropriate tuning. Therefore, the processing system 300 may operate both input sensing and display updating functions using only three wires. Other configurations including more wires may be possible, but each additional wire generally adds to the complexity and costs of processing system 300. For example, to include another connection between each controller 250 and the timing controller 220 requires a number of wires corresponding to the several controllers 250, as well as routing the connections through various layers and connecters of the input device, such as through flexible connecters, conductive pads, routing through glass or other display layers, and so forth.

In alternative embodiments, other timing sources may be used. In cases where a delay-locked loop is used, a ring oscillator can be locked to the clock signal. Other timing sources may include RC-based oscillators or other timing methods that provide time-outs for resetting, error recovery, or debugging communication channels. In particular, other serial connections may be self-timed (e.g., I2C or SPI) to allow testing, sequencing, or alternate control of the sensor module 222 independent from the display module 224. Separate connections can be made for this purpose at higher cost and complexity.

During operation of the processing system 300, there may be times during which the timing controller 220 is not transmitting display data on the downlink 310 for display updating. During these times, the processing system 300 may, e.g., be performing sensing measurements using the controllers 250, performing conversions of the sensing measurements using the ADCs, sending sensing configuration data through the downlink, or sending data to the timing controller 220 through the uplink 315. Although no display updating is occurring, the timing controller 220 may still continue to transmit a clock signal using downlink 310, even if no sensing configuration data or display data is included therewith. In some embodiments, the transmitted clock signal is a word clock. In other embodiments, the transmitted clock signal is a line clock. The source drivers 252 and/or gate drivers 335 on various controllers 250 receive the transmitted clock signal. In some embodiments, during extended periods without receiving a display data line configuration, or without receiving a downlink clock, the source driver may enter a low power mode (e.g., timed by a separate oscillator) and/or a special clock recovery mode that allows rapid (e.g., within about the time of one display line) delay-locked loop clock recovery when the display embedded clock data resumes (e.g., after an extended vertical blanking time with a low refresh rate, such as less than 48 Hz).

For some differential signaling protocols (such as I2C), sensing data may be transmitted on the uplink 315 when the two wires 312 of the downlink 310 are not being modulated relative to each other. For example, in I2C, when both the serial data and the serial clock lines are in the same state (whether high or low), the signal is not considered a valid data signal.

The depicted configuration of processing system 300 can provide additional benefits. For example, when the processing system 300 is first powered on, the timing controller 220 may need to determine whether the source drivers 252 of controllers 250 are receiving the transmitted data. The display data is sent at a relatively high rate (e.g., 1 Gbps or higher), but some substantial amount of time is often required before the delay-locked loop is able to synchronize with the embedded clock of the downlink 310. During that time, the processing system 300 cannot count on the display data or acquired sensing data as being reliable. In some embodiments, the timing controller 220 transmits a relative simple data signal on the downlink 310 (such as a clock signal without accompanying display or touch data) until the timing controller 220 receives a "lock" signal from the controllers 250 indicating synchronization with the clock signal has been achieved. Generally, sending the clock signal by itself may be easier for the delay-locked loop to acquire.

In one configuration, a clock "lock" signal could be implemented using a separate wire connected with the timing controller 220 and daisy-chained with each controller 250 in sequence before returning to the timing controller 220. Responsive to an initial signal from the timing controller 220, each controller 250 sequentially indicates when a lock has been achieved. When the lock is acquired on the last controller 250, a signal is sent from the last controller 250 to timing controller 220, which indicates that all controllers have locked. However, this configuration may result in extra cost and/or complexity in routing additional connections between the different controllers 250 and timing controller 220. Additionally, it may be difficult to diagnose which of the controllers 250 cannot achieve a lock, as the only feedback to the timing controller 220 is the signal from the last controller 250. In some embodiments, the uplink 315 can instead be used to send the clock lock signal. If at start-up, the uplink 315 of a particular controller 250 remains in a particular state (whether low or high states, a high-impedance state, etc.) or otherwise fails to transmit a lock signal during an expected time period, the timing controller 220 may assume that the particular controller 250 does not have a lock. The timing controller 220 may further be configured to adjust tuning parameters with each of the controllers 250 (such as by pre-emphasizing signals) to improve a signal-to-noise ratio (SNR) or other performance metric for the particular communications link 307.

The timing controller 220 at times may wish to reset the controllers 250. Like the first clock lock signal implementation, a configuration might include a daisy-chained link across each of the controllers 250 using an extra wire. The timing controller 220 raises the link to reset the controllers 250 and should ultimately receive back a raised line from the last controller 250 of the sequence.

In some embodiments, a reset signal can be sent by the timing controller 220 by adjusting the voltage(s) of the downlink 310. For example, if both differential inputs of downlink 310 are driven to a high state or a low state—which could correspond to an invalid input state—the controllers 250 can be reset using just the downlink 310. An acknowledgement of the reset can be detected by the timing controller 220, e.g., by measuring a voltage on the uplinks 315 for the controllers 250. Such a reset signal may also place the controllers on the panel in a low power or rapid clock recovery state (e.g., lowering buffer bias currents, turning off unneeded circuitry, reducing other oscillator frequencies, etc.).

For example, say that both wires of the downlink 310 are configured to signal in a modulated power domain, e.g., 0.5 V±200 mV. When the timing controller 220 starts up, both wires may be driven low (i.e., to 0.3 V) so that all the controllers 250 are held in a reset state. In this state, the processing system 300 has relatively low current consumption. To bring the controllers 250 out of reset, the timing controller 220 raises the voltage of the wires to, say, the center of the modulated power domain (e.g., to 0.5 V). The controllers 250 come out of the reset state, which causes each corresponding uplink 315 to be transitioned to a high state (and held there). Following this, the timing controller 220 sends a clock signal to the controllers 250, and each controller 250 can indicate that it is locked to the clock signal by transitioning its uplink 315 to a low state, sending its own clock signal on the uplink 315, etc. without requiring an additional wire.

Figure 4A:
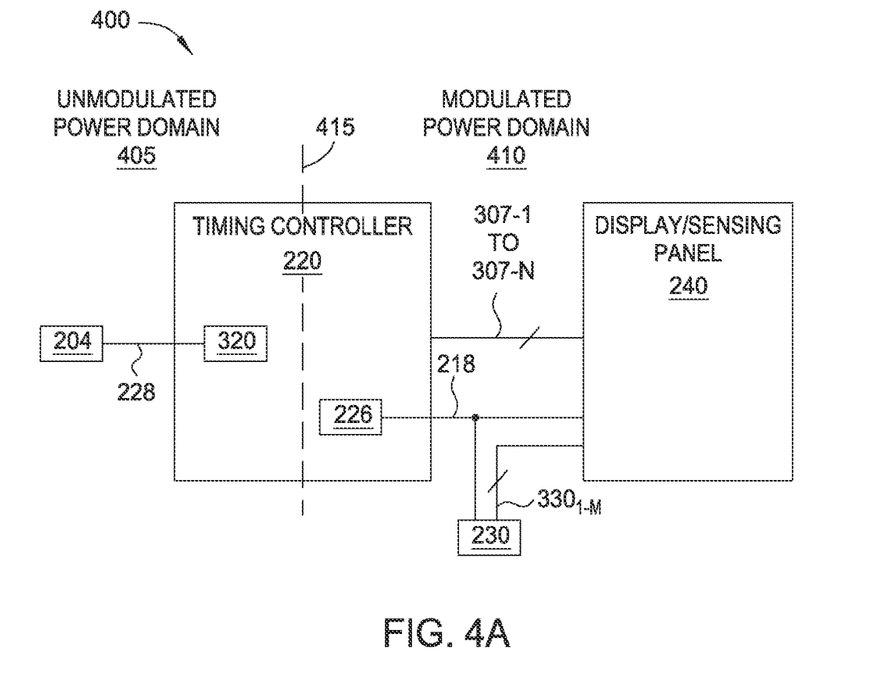
FIGS. 4A and 4B illustrate exemplary arrangements of a processing system across unmodulated and modulated power domains, according to embodiments described herein.
Figure 4B:
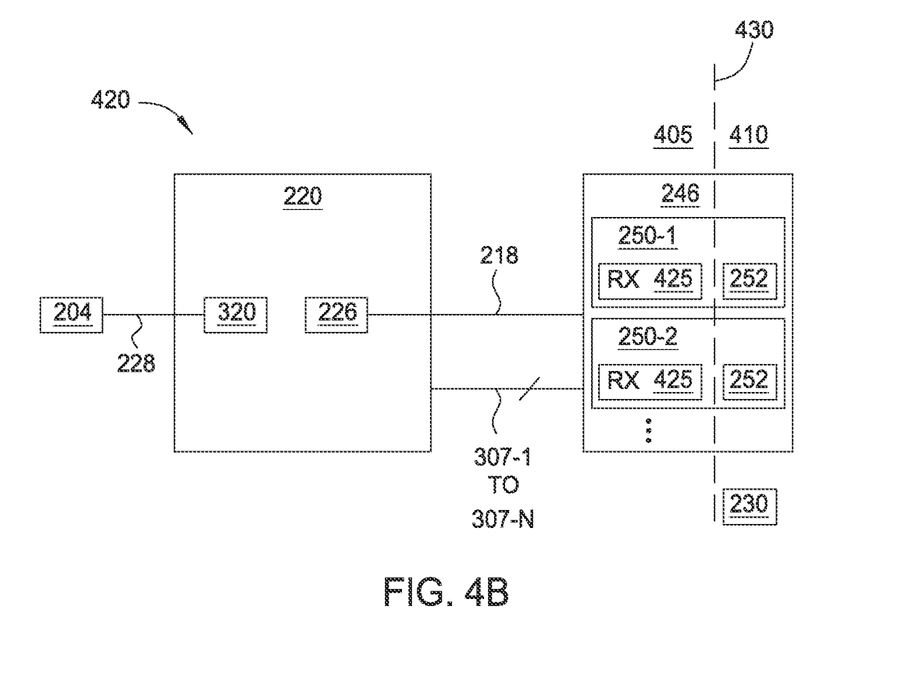

FIGS. 4A and 4B illustrate exemplary arrangements of a processing system across unmodulated and modulated power domains, according to embodiments described herein.

Arrangement 400 depicts the timing controller 220 and the display/sensing panel 240. The host 204 is connected with the timing controller 220 at the high-speed data interface 320. In this embodiment, the host 204 and high-speed data interface 320 communicate in an unmodulated power domain 405. The timing controller 220 is further configured to communicate with the display/sensing panel 240 in a modulated power domain 410 (separated from the unmodulated power domain 405 by a dashed line 415). Consistent with the description provided above, the timing controller 220 modulates the power supply and provides a reference signal 218 that informs the controllers of the display/sensing panel 240 of the depth of modulation. For example, if the modulation amplitude varies over time, there can be uncertainty by the controllers 250 as to the correct amplitude of sensing measurements, display signals, etc., which can reduce the display updating and/or input sensing performance of the input device. However, providing the reference signal 218 relative to an unmodulated reference (e.g., a chassis ground or VDD) to the controllers 250 when the power signals $330_{1-M}$ are modulated can remove the uncertainty about the amplitude of the modulated signals. Alternately, when the power signals $330_{1-M}$ are not modulated relative to chassis ground, a modulated reference relative to reference signal 218 can still be supplied to maintain consistent scaling of measurement amplitudes (e.g., during interference detection modes). In arrangement 400, the timing controller 220 provides a single-chip solution for providing unmodulated and modulated power domains 405, 410, so that multiple implementations of level-shifting within the processing system are not needed, reducing the complexity of the processing system. In one exemplary implementation, where data is transmitted only when the panel is not modulated, the level shifting need only provide tolerance to the modulated voltage (e.g., data is only transmitted when the reference signal 218 is at chassis ground and no differential signals are generated when reference signal 218 is away from chassis ground).

Arrangement 420 depicts the timing controller 220 and the display/sensing circuitry 246. The unmodulated power domain 405 and modulated power domain 410 are separated by the dashed line 430. The host 204 is connected with the timing controller 220 at the high-speed data interface 320. In this embodiment, the host 204 and high-speed data interface 320 communicate in the unmodulated power domain 405. The timing controller 220 is further configured to communicate with the display/sensing panel 240 in the unmodulated power domain 405. In this case, receivers 425 of the controllers 250 can receive high-speed link data directly from the timing controller 220 on communications link 307 without requiring any level-shifting circuitry. The controllers 250 include level-shifting circuitry enabling communication with other components in the modulated power domain 410. The power management controller 230 may also operate partly in the unmodulated power domain 405 and the modulated power domain 410. In some embodiments, a separate power management controller may be provided (e.g., one PMIC 230 for providing modulated panel voltages VCOM, AVDD, VGH, VGL, and another PMIC 230 for providing the backlight or low voltage unmodulated digital signals on the timing controller 220). In one embodiment, the arrangement 400 allows the modulation of the panel 240 relative to the chassis ground to be driven by a source on at least one of the controllers 250.

In some embodiments, the controllers 250 may operate in the unmodulated power domain 405 for communication with the timing controller 220, and using level-shifting circuitry establish separate modulated regime(s) for the source drivers 252 and for common voltage Vcom. The source drivers 252 in the modulated power domain 410 can then provide modulated voltages to gate drivers of other controllers 250 and to the power management controller 230 to configure the operation of each of these. In an alternative implementation, the power management controller 230 establishes the various voltage levels of the modulated power domain 410, such that the timing controller 220 and controllers 250 do not need to include any level-shifting circuitry. For example, the power management controller 230 could provide the level shifting for communications between the timing controller 220 and controllers 250, and could further control the gate drivers in the modulated power domain 410.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system, comprising:
    a first controller coupled with a second controller via a first communication link,
    the first controller configured to transmit display data to the second controller via the first communication link, and
    the second controller configured to:
        drive, using the display data, one or more coupled display electrodes for performing display updating,
        operate, based on configuration data received from the first controller via the first communication link, one or more coupled sensor electrodes to acquire capacitive sensing data, wherein the configuration data indicates one or more of (i) which of the one or more coupled sensor electrodes to operate to acquire the capacitive sensing data, and (ii) a signal to be driven by the second controller onto the one or more coupled sensor electrodes, and
        transmit the capacitive sensing data to the first controller via the first communication link.

2. The processing system of claim 1, wherein the first controller includes a timing controller for a display device, and the second controller includes a source driver for the display device.

3. The processing system of claim 1, wherein the one or more coupled sensor electrodes include at least one of the one or more display electrodes.

4. The processing system of claim 1, further comprising:
    a third controller coupled with the first controller via a second communication link, the first controller further configured to:
        transmit, via the second communication link, display data to the third controller, and
        receive, via the second communication link, capacitive sensing data acquired by the third controller.

5. The processing system of claim 1, wherein the first controller is further configured to transmit at least a first reference signal to the second controller, wherein one or more of the first communication link and the first reference signal are provided in a modulated domain.

6. The processing system of claim 1, wherein downlink data is transmitted via first and second conductive connections of the first communication link, the downlink data comprising the display data and the configuration data, and
wherein uplink data is transmitted via a third conductive connection of the first communication link, the uplink data comprising the capacitive sensing data.

7. The processing system of claim 6, wherein the downlink data further comprises an embedded clock signal, and
wherein the uplink data is transmitted using timing specified by the embedded clock signal.

8. The processing system of claim 7, wherein the first controller is further configured to mitigate a phase delay associated with the transmitted uplink data.

9. The processing system of claim 6, wherein the downlink data further comprises read request data requesting a read of one or more memory locations of the second controller, and
wherein the uplink data further comprises read data corresponding to the one or more memory locations.

10. The processing system of claim 1, wherein the first controller is implemented using a first process corresponding to a first feature size, and
wherein the second controller is implemented using a second process corresponding to a second feature size that is larger than the first feature size.

11. The processing system of claim 10, wherein the first controller is implemented on a printed circuit board of an input device, and
wherein the second controller is implemented on one or more layers of a display of the input device.

12. A first controller comprising circuitry configured to:
receive, via a first communication link, display data from a second controller;
drive, using the display data, one or more coupled display electrodes for performing display updating;
operate one or more coupled sensor electrodes to acquire capacitive sensing data; and
transmit the capacitive sensing data to the second controller via the first communication link,
wherein the first controller is further configured to receive configuration data from the second controller via the first communication link, wherein the configuration data affects operation of the one or more coupled sensor electrodes to acquire capacitive sensing data, and
wherein the configuration data indicates one or more of (i) which of the one or more coupled sensor electrodes to operate to acquire the capacitive sensing data, and (ii) a signal to be driven onto the one or more coupled sensor electrodes.

13. The first controller of claim 12, wherein the first controller comprises a source driver for a display device, and the second controller comprises a timing controller for the display device.

14. The first controller of claim 12, wherein the one or more coupled sensor electrodes include at least one of the one or more display electrodes.

15. The first controller of claim 12, wherein the first controller is further configured to receive at least a first reference signal from the second controller, wherein one or more of the first communication link and the first reference signal are provided in a modulated domain.

16. A first controller comprising circuitry configured to:
transmit display data to a second controller via a first communication link, the second controller configured to drive one or more display electrodes to perform display updating based on the display data;
transmit configuration data to the second controller via the first communication link, wherein the configuration data configures the second controller to acquire capacitive sensing data via operation of one or more coupled sensor electrodes, wherein the configuration data indicates one or more of (i) which of the one or more coupled sensor electrodes to operate to acquire the capacitive sensing data, and (ii) a signal to be driven onto the one or more coupled sensor electrodes; and
receive, via the first communication link, capacitive sensing data acquired by the second controller based on the configuration data and using the one or more coupled sensor electrodes.

17. The first controller of claim 16, wherein the first controller comprises a timing controller for a display device, and the second controller comprises a source driver for the display device.

18. The first controller of claim 16, wherein the one or more coupled sensor electrodes include at least one of the one or more display electrodes.

19. The first controller of claim 16, the first controller further configured to:
transmit display data to a third controller via a second communication link, and
receive, via the second communication link, capacitive sensing data acquired by the third controller.

20. The first controller of claim 16, wherein the first controller is further configured to transmit at least a first reference signal to the second controller, wherein one or more of the first communication link and the first reference signal are provided in a modulated domain.

* * * * *